United States Patent Office
3,803,163
Patented Apr. 9, 1974

3,803,163
PROCESS FOR THE PREPARATION OF 1-(5-NITRO-THIAZOL-2-YL)-IMIDAZOLIDINONES
Serge Tchelitcheff, Thiais, France, assignor to Rhone-Poulenc S.A., Paris, France
No Drawing. Filed Mar. 22, 1972, Ser. No. 237,039
Claims priority, application France, Mar. 24, 1971, 1,382
Int. Cl. C07d 99/10
U.S. Cl. 260—306.8 R                 6 Claims

ABSTRACT OF THE DISCLOSURE 1-(5-nitrothiazol)imidazolidin-2-one and 1-(5-nitrothiazol-2-yl)-4-methyl-imidazolidin-2-one, which are useful as parasiticides, are prepared by a new process involving hydrolyzing a 2-alkylthio-(or 2-benzylthio)-1-(5-nitrothiazol-2-yl)-$\Delta^2$-imidazoline in an acid medium and cyclizing the acid addition salt, e.g. hydrochloride, hydrobromide or hydrogen sulphate, of the alkyl (or benzyl) N-(2-aminoalkyl)-N-(5-nitrothiazol-2-yl)-thiolocarbamate so obtained by treatment with a base, e.g. potassium bicarbonate or ammonia.

---

This invention relates to a new process for the preparation of 1-(5-nitrothiazol-2-yl)imidazolidinones of the formula:

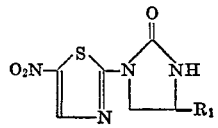

(I)

wherein $R_1$ represents a hydrogen atom or a methyl radical, which are known to possess remarkable chemotherapeutic properties and are particularly valuable as parasiticides and, more precisely, as anti-bilharzia agents.

According to the invention, the compounds of Formula I are obtained by the new process which comprises the hydrolysis, in an acid medium, of an imidazoline of the general formula:

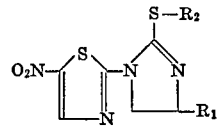

(II)

wherein $R_1$ is as hereinbefore defined and $R_2$ represents an alkyl radical containing 1 to 6 carbon atoms or a benzyl radical, followed by the cyclization, in a neutral or alkaline medium, of the intermediate product in the form of an acid addition salt of the general formula:

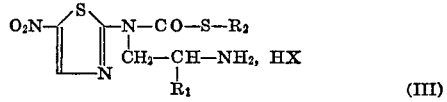

(III)

wherein $R_1$ and $R_2$ are as hereinbefore defined, and HX represents the acid used in the hydrolysis.

The hydrolysis reaction is generally carried out by heating, preferably under reflux, a solution or a suspension of an imidazoline of general Formula II in an aqueous solution of an acid, for example hydrochloric acid, hydrobromic acid or sulphuric acid, the normality of which is between 0.1 N and 4 N.

The cyclization of the salt of general Formula III is achieved by the neutralization of an aqueous solution of it by means of a base, for example potassium bicarbonate or ammonia, at a temperature of from 10° to 30° C.

The imidazole derivative of general Formula II can be prepared by the reaction of a compound of the general formula:

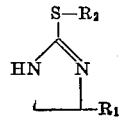

(IV)

(wherein $R_1$ and $R_2$ are as hereinbefore defined) with a derivative of 5-nitrothiazole of the general formula:

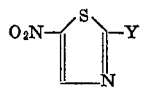

(V)

wherein Y represents the acid residue of a reactive ester, for example a halogen atom. The reaction is generally carried out in an inert organic solvent such as an ether (e.g. tetrahydrofuran), an alcohol (e.g. methanol) or a hydrocarbon (e.g. benzene) at a temperature between 15° C. and the boiling point of the reaction mixture.

The products of Formula I obtained according to the process of the present invention can optionally be purified by physical methods such as distillation, crystallization or chromatography.

The process according to the present invention enables the products of Formula I to be obtained in good yields and from readily available starting materials.

The following non-limitative examples illustrate the process according to the invention.

EXAMPLE 1

A suspension of 2-methylthio-1-(5-nitrothiazol-2-yl)-$\Delta^2$-imidazoline (2.5 g.) in N hydrochloric acid (20 cc.) is heated under reflux for 15 minutes. After cooling, the crystals which have appeared are filtered off. Methyl N-(2-aminoethyl)-N-(5-nitrothiazol-2-yl) - thiolocarbamate hydrochloride (1.75 g.), melting at 230–235° C., is thus obtained.

These crystals are dissolved in water (50 cc.) and the solution obtained is neutralized by the addition of potassium bicarbonate (2 g.). An oil forms which rapidly crystallizes. The crystals are filtered off, washed with water (10 cc.) and then dried under reduced pressure (20 mm. Hg). 1-(5-nitrothiazol-2-yl)-imidazolidin-2-one (0.7 g.), melting at 264° C., is thus obtained.

The 2-methylthio-1-(5-nitrothiazol-2-yl)-$\Delta^2$-imidazoline used as starting material can be prepared in the following manner:

2-bromo-5-nitrothiazole (2.1 g.) is added, all at once, to a solution of 2-methylthio-$\Delta^2$-imidazoline (2.3 g.) in methanol (25 cc.) and then the mixture is heated under reflux for 1 hour. After cooling, the precipitate obtained is filtered off. 2-methylthio-1-(5-nitrothiazol-2-yl)-$\Delta^2$-imidazoline (1.2 g.), melting at 190° C., is thus obtained.

1-(5-nitrothiazol-2-yl)-imidazoline-2-one can be prepared in a similar manner using any one of the following intermediate products:

2-ethylthio-1-(5-nitrothiazol-2-yl)-$\Delta^2$-imidazoline melting at 160° C.;

2-hexylthio-1-(5-nitrothiazol-2-yl)-$\Delta^2$-imidazoline melting at 100° C., and 2 - benzylthio-1-(5-nitrothiazol-2-yl)-$\Delta^2$-imidazoline melting at 160° C.

EXAMPLE 2

By processing as described in Example 1, but starting with 4-methyl - 2 - methylthio-1-(5-nitrothiazol-2-yl)-$\Delta^2$-imidazoline melting at 175° C., 1-(5-nitrothiazol-2-yl)-4-methyl-imidazolin-2-one, melting at 244° C., is obtained.

I claim:
1. Process of the preparation of 1-(5-nitrothiazol-2-yl)-imidazolidinones of the formula:

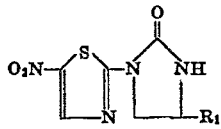

wherein $R_1$ represents hydrogen or methyl, which comprises heating in an aqueous solution of a strong mineral acid an imidazoline derivative of the formula:

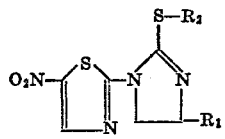

(wherein $R_1$ is as hereinbefore defined, and $R_2$ represents alkyl of 1 through 6 carbon atoms or benzyl) and neutralizing the intermediate product in the form of an acid addition salt of the formula:

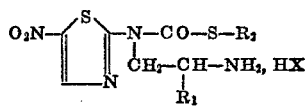

(wherein $R_1$ and $R_2$ are as hereinbefore defined, and HX represents the said strong mineral acid with a base to form a 1-(5-nitrothiazol-2-yl)-imidazolidin-2-one.

2. Process according to claim 1 in which a solution or suspension of the said imidazoline derivative is heated in an aqueous solution of an acid, the normality of which is between 0.1 N and 4 N.

3. Process according to claim 2 in which the solution or suspension of the imidazoline derivative in the aqueous acid solution is heated under reflux conditions.

4. Process according to claim 1 in which the said strong mineral acid is hydrochloric acid, hydrobromic acid or sulphuric acid.

5. Process according to claim 1 in which the intermediate product is neutralized in aqueous solution with a base at a temperature of from 10° to 30° C. to form the 1-(5-nitrothiazol-2-yl)-imidazolin-2-one.

6. Process according to claim 5 in which the base is potassium bicarbonate or ammonia.

References Cited
UNITED STATES PATENTS 3,627,777  12/1971  Schmidt et al. ____ 260—306.8 R
1,912,849  6/1933  Kranzlgin et al. ____ 260—309.6

RICHARD J. GALLAGHER, Primary Examiner